United States Patent [19]

Meulenberg

[11] 4,333,781

[45] Jun. 8, 1982

[54] METHOD AND APPARATUS FOR MANUFACTURING DECALS

[76] Inventor: Daniel R. Meulenberg, 4690 Stauffer, SE., Kentwood, Mich. 49508

[21] Appl. No.: 122,430

[22] Filed: Feb. 19, 1980

[51] Int. Cl.[3] ...................... B32B 31/00; C22C 23/00; B07C 5/00; C09J 5/00

[52] U.S. Cl. .................................... 156/152; 156/269; 156/361; 156/510; 156/541; 83/152; 83/27; 209/643; 493/373; 156/252; 156/513; 156/344; 156/248

[58] Field of Search ............... 156/248, 247, 256, 267, 156/269, 268, 513, 510, 519, 521, 361, 238, 542, 252, 344; 209/643; 428/40, 41, 42; 83/177, 100, 183, 98, 914, 99, 152; 493/370, 373, 362, 393, 365, 342

[56] References Cited

U.S. PATENT DOCUMENTS

| | | | |
|---|---|---|---|
| 1,140,854 | 5/1915 | Sally | 83/98 |
| 1,252,822 | 1/1918 | Lorioli | 83/99 |
| 1,491,211 | 4/1924 | Taylor | 209/643 |
| 1,825,250 | 9/1931 | Rehak | 83/99 |
| 2,112,419 | 8/1934 | Krause et al. . | |
| 2,254,217 | 9/1941 | Grupe | 156/519 |
| 2,948,328 | 8/1960 | Coventry | 156/268 |
| 3,103,842 | 9/1963 | Winkler | 83/99 |
| 3,169,895 | 2/1965 | Sohn | 156/361 |
| 3,186,274 | 6/1965 | Winkler et al. | 493/370 |
| 3,192,809 | 7/1965 | Crouch et al. | 83/152 |
| 3,200,685 | 8/1965 | Heilbrunn | 83/98 |
| 3,269,234 | 8/1966 | Crouch | 83/542 |
| 3,404,607 | 10/1968 | Feick et al. | 493/362 |
| 3,410,183 | 11/1968 | Sarka | 493/370 |
| 3,430,542 | 3/1969 | Sarka | 493/370 |
| 3,459,080 | 8/1969 | Goettsch | 83/98 |
| 3,570,342 | 3/1971 | Mundt et al. | 83/914 |
| 3,680,419 | 8/1972 | Stoop | 83/98 |
| 3,737,363 | 6/1973 | Schmidt | 493/370 |
| 3,860,473 | 1/1975 | Wesen | 156/268 |
| 3,879,246 | 4/1975 | Walker | 156/519 |
| 4,031,816 | 6/1977 | Matsuo | 493/373 |
| 4,061,521 | 12/1977 | Lerner et al. | 156/521 |
| 4,113,538 | 9/1978 | Green | 156/249 |
| 4,114,355 | 9/1978 | Davies et al. | 83/152 |
| 4,124,429 | 11/1978 | Crankshaw | 156/542 |
| 4,153,496 | 5/1979 | Swift | 156/267 |

FOREIGN PATENT DOCUMENTS

| | | | |
|---|---|---|---|
| 1192956 | 10/1959 | Fed. Rep. of Germany | 156/269 |

*Primary Examiner*—Edward C. Kimlin
*Assistant Examiner*—L. Falasco
*Attorney, Agent, or Firm*—Waters, Lesniak & Willey

[57] ABSTRACT

A method and apparatus for manufacturing decals from a web of decal material, wherein core portions of waste material in the decals automatically can be removed from the decals. In one aspect of the invention, backing material is stripped from the decal material; the decal configurations are cut into the decal material; the waste exterior portion of the decal material is removed from the decals while the decals are retained in position on a vacuum wheel; and the core portions are removed by the vacuum in the wheel through enlarged openings opposite the core portions on the decals. In another aspect of the invention, the decal configurations are cut into the decal material while it remains on the backing material; the exterior waste portions are removed; and the core portions are removed by passing the backing material over the sharp edge of a peeling bar while pressing the decal portion downwardly on the backing material. The core portion is not pressed downwardly and thus peels from the backing material as the backing material passes over the sharp edge. A pneumatic or mechanical core-picking mechanism is employed to facilitate removal of the cores from the decals. In another aspect of the invention, the core configuration of the decal is cut through the decal material and the backing material, and the core section of decal and backing is pneumatically removed from the rest of the web.

17 Claims, 9 Drawing Figures

METHOD AND APPARATUS FOR MANUFACTURING DECALS

BACKGROUND OF THE INVENTION

1. Field of the Invention

This invention relates to a method and apparatus for manufacturing decals from a continuous web of decal material, and more particularly to a system wherein core portions of waste material automatically can be removed from the decals during the manufacturing process.

2. Description of Prior Art

In conventional manufacturing operations for producing decals, the decals are typically cut out of sheet material comprising decal material affixed to a paper or paper-like backing. The decal material is a synthetic decal stock, which may be vinyl or a polyester material such as nylon or other commonly used material. In such an operation, a heated die cuts the configuration of the decals into decal material, without cutting the backing material, and waste material on the exterior portions of the decals (which is commonly referred to as "weed") is stripped away from the backing material. When the decals are intended to have open interior portions (such as the open portions in the loops of the letter B or the open interior portion of the letter O), the waste core portions in the interior portions of the decals are picked out by hand. This is a laborious, time consuming, and expensive process and greatly increases the cost of decals having open interior portions.

An object of the present invention is to provide a method and apparatus for producing decals from a continuous web of decal material and to provide in this process a means for automatically removing waste core portions of decals. As used herein, the term "decals" incudes any type of character, design, picture, or logo formed of paper, vinyl or other flexible sheet material and designed to be affixed to a surface for information or decoration.

SUMMARY OF THE INVENTION

The present invention comprises a method and apparatus for manufacturing decals from a web of synthetic decal stock that is especially effective where the decals have an open interior portion that requires removal of a separate core portion of waste material from the decal stock during manufacturing. The method and operation of the apparatus comprises stripping any backing material from the decal stock; passing the decal stock over a cutting surface; cutting the decals in the decal stock at spaced intervals in the web as the decal stock is moved over the cutting surface; passing the decals over a vacuum surface wherein the decals are urged to adhere to a perforated surface by a vacuum drawn through the perforations, the perforations in the surface being small enough to prevent the decal itself from being drawn through the perforations but the vacuum surface having enlarged openings conforming in position to any waste core portions of the decal, the enlarged openings and the vacuum being sufficient to draw the waste core material through the openings in the surface and away from the decals, leaving the decals with their desired open interior portions; stripping away from the decals the waste portion of the decal stock on the exterior of the decals, such that the decals are retained by the vacuum on the vacuum surface; and removing the decals from the vacuum surface for packaging.

In the present invention, the cutting surface and vacuum surface comprise a vacuum wheel over which the decal material passes. A vacuum drawn through perforations in the outer periphery of the wheel hold the decals to the wheel while the waste material on the outside of the decals (i.e., the "weed") is stripped away. The waste core portions are drawn into the wheel by the vacuum through enlarged openings in the wheel positioned opposite the core portions.

The decals are cut into the web by means of a rotating heated die having several spaced die elements that rotate in registry with the movement of the perforations and openings in the vacuum wheel.

After removal of the weed and core portions, the decals are applied to new backing material (or reapplied to the old backing material) and a premask material is placed over the face of the decals. The decals are then cut into individual units for packaging.

In another aspect of the present invention, the decal configuration is cut into the decal material without removing the backing material. The weed is then stripped away from the backing material in a conventional manner. The core portions are removed from the decals and backing material by passing the backing material over a sharp edge of "peeling bar". This urges the decals and core portions to peel away from the backing material. However, while the decals are passing over the sharp edge or peeling bar, the decals are pressed resiliently against the backing material so the core portions alone are permitted to peel from the backing material. A pneumatic or mechanical picking mechanism can be employed to enhance the removal of the core portions from the decals as they pass over the peeling bar.

In another aspect of the present invention, a die cuts only through the decals in order to form the exterior configurations of the decals but it cuts through both the decal material and the backing material in forming the inner configurations of the decals. The core portions, including both the decal material and backing material, are then removed pneumatically from the web, as by directing an air jet downwardly on the web so as to urge the core portions downwardly into an open area below the web.

The method and apparatus of the present invention provide a substantial advantage over previous methods for manufacturing decals. The present invention vastly improves the speed by which decals can be made, and it completely eliminates the substantial time and expense in manually removing core waste portions from decals.

These and other features and advantages of the present invention will appear below. For purposes of illustration, but not of limitation, preferred embodiments of the present invention are described in detail below and shown in the appended drawings.

DETAILED DESCRIPTION OF PREFERRED EMBODIMENTS

Figure 1:
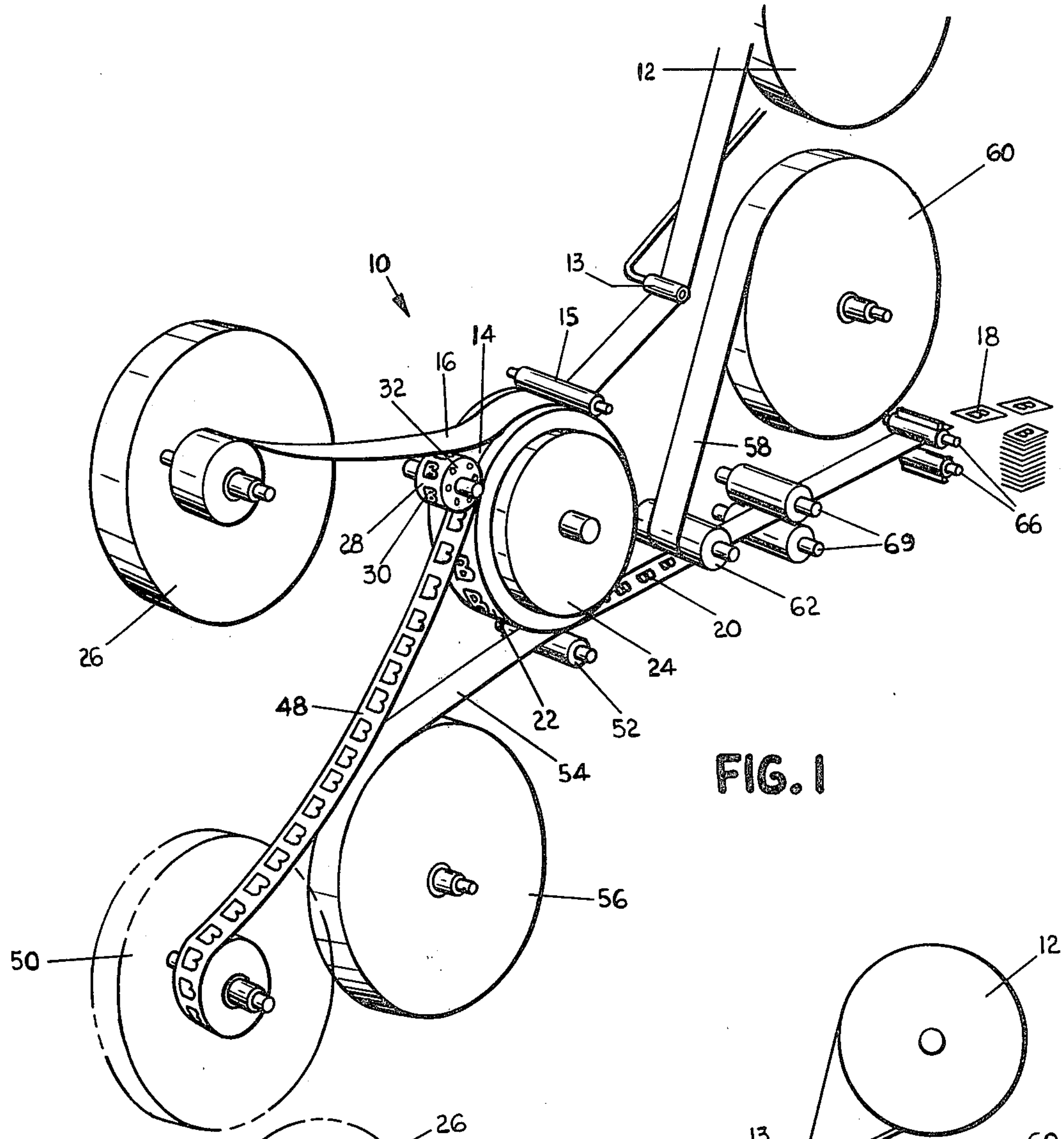
FIG. 1 is a schematic perspective view of the decal making apparatus of the present invention.

Referring now to the drawings, decal manufacturing apparatus 10 constructed in accordance with the present invention is shown in FIG. 1. In this apparatus, decals 18 are fabricated in a continuous operation from a web of decal material 14 and attached backing material 16 (made of release paper or the like), which is fed from a roller 12. If the decal material does not have a pre-applied adhesive, the decal material may not originally have a backing material 16.

The decals 18 can be of any configuration. However, the present apparatus and method are specifically designed to overcome problems associated with decals having open interior portions that are surrounded by decal material. Such interior portions can be of any shape, including the openings 20 in the loops of the letter "B" of the open portions in the center of the letter "O". These portions, which are referred to as "core" portions, are depicted illustratively in the present application as core portions 20 of the letter "B". These portions pose special problems for decal manufacturing apparatus, because they have to be removed from the decals by hand, which is a time consuming and expensive process.

In the apparatus of the present invention, the entire decal manufacturing process, including core removal, occurs continuously and automatically. In this apparatus, the decal material 14 is first transferred from roller 12 (a powered uncoiler having its own D.C. motor) to the outer periphery 22 of a vacuum wheel 24. Web tensioning device 13 maintains tension in the web, while roller 15 brings the web into contact with the wheel. After the web passes under roller 15 with the decal material face down on the wheel, any backing material 16 is stripped from the decal material and rolled up on a roller 26, which is a powered recoiler having its own D.C. motor. This step is not necessary if the decal material does not have a backing paper.

After being separated from backing material 16, the decal material 14 is conveyed on vacuum wheel 24 through a heated rotary cutting die 28. Die 28 is rotatably mounted on an axis parallel to the axis of the vacuum wheel with its outer periphery in registration with the outer periphery of the cutting wheel. The rotary cutting die is provided with a plurality of die elements 30 each having the configuration of the decal to be formed. As the rotary die rotates in registry with the vacuum wheel, the outer periphery of the vacuum wheel forms the cutting surface and the die presses downwardly and cuts the configuration of the decal into the decal material.

Figure 2:
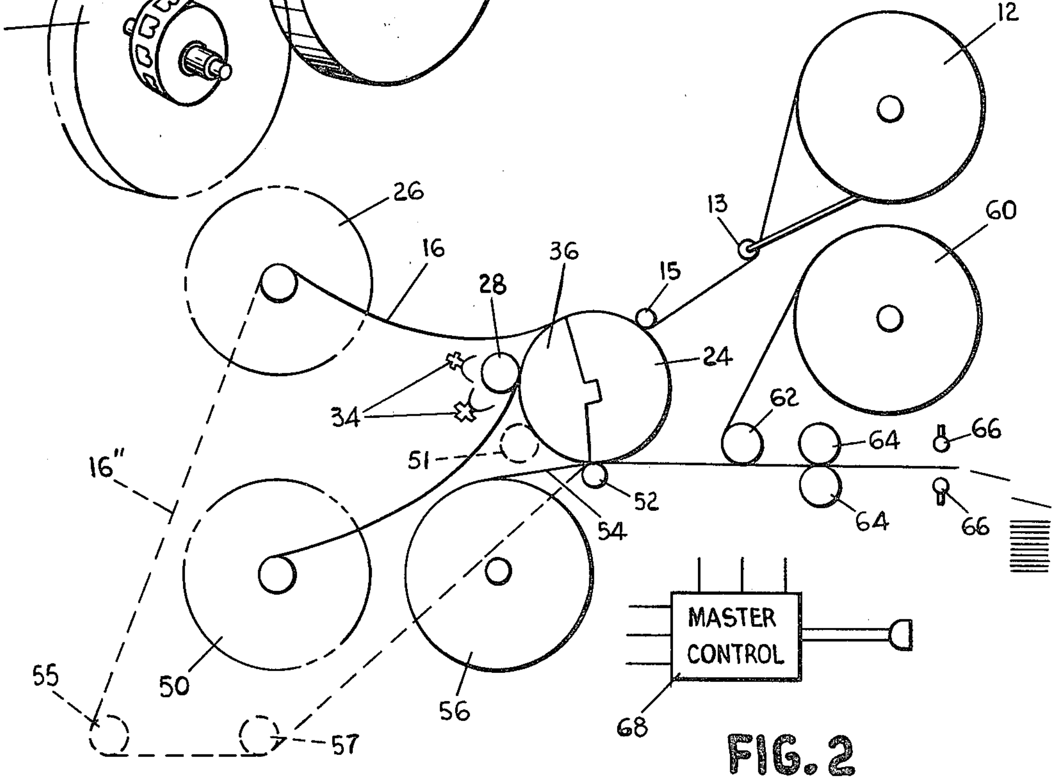
FIG. 2 is a schematic, side elevational view of the apparatus of FIG. 1.

Rotary die 28 is a heated die, so that the contact of the die with the decal material cuts the material and melts the material slightly so as to insure a complete separation of the decal from the waste material. Rotary die 28 can be heated by internal transverse electric heating elements or cartridges 32 of the type shown in FIG. 1, or it can be heated by external heat lamps as shown in FIG. 2. Both electronical heating cartridges 32 and heat lamp 34 can be utilized for heating the die.

For manufacturing decals from vinyl, the die is heated to approximately 325° F. (162° C.). A vacuum wheel formed of steel or other material having a melting point above this temperature can be employed in this operation. For a more durable polyester decal (e.g., material sold under the brand name Mylar) a temperature of 450°–575° F. (232°–301° C.) is required. This temperature range requires both a cutting and vacuum wheel that can withstand higher temperatures. Steel wheels are preferred for this purpose. Any suitable thermoplastic synthetic material that is suitable for decals can be employed in the present invention, but vinyl appears to be the most common.

Figure 4:
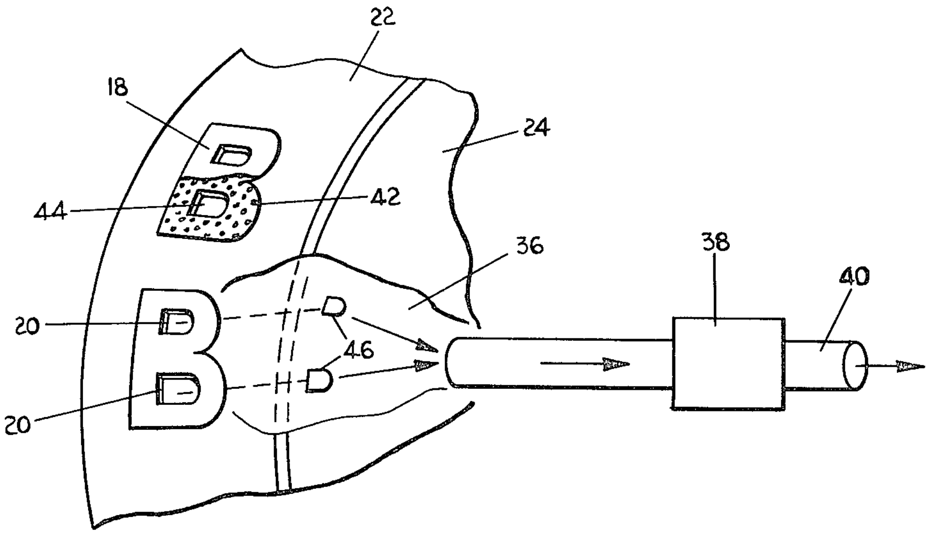
FIG. 4 is a schematic perspective view of the section of the vacuum wheel employed in the embodiments of FIG. 1 and FIG. 3.

After the decals have been cut into the decal material, the formed decals are transferred away from the cutting station on the surface of vacuum wheel 24 in the manner shown in FIG. 4. Vacuum wheel 24 comprises a hollow interior portion 36 of the configuration shown in FIG. 2. A vacuum is drawn in the hollow interior portion by means of a pump 38 (shown schematically) in FIG. 4), such that air is withdrawn from the interior portion of the wheel and exhausted through conduit 40. The outer peripheral surface 22 of vacuum wheel 24 is provided with plurality of small openings 42 forming the configuration of decal 18. The vacuum in the interior of vacuum wheel 24 creates an air flow through openings 42 and a vacuum at the surface of the wheel. The components of the system are rotated in precise registry so that decals cut into the decal material are placed directly on mating configurations in the vacuum wheel, such that the vacuum drawn through openings 42 holds decals 18 on the surface of the wheel.

The open interior portions 20 of the decals are formed by means of enlarged openings 44 formed opposite the open interior portions of the vacuum wheel. Enlarged openings 44 desirably are slightly smaller than the open interior portions in decals 18, so that the wheel forms a backing for forming the decals. However, when the vacuum is drawn through openings 44, the core portions 46 of waste decal material are drawn inwardly into the interior portions of the vacuum wheel. The core portions are then exhausted from the interior portions of the vacuum wheel by pump 38.

The exterior waste portion of the decal material 48 is easy to remove, because it remains in the form of a continuous web. This material, which is called "weed", is lifted or stripped off the vacuum wheel 24 and rolled onto take-up roller 50, which is a powered recoiler of the same type as roller 26.

The weed is removed from the decal material after the decals are cut into the decal material with the decals being retained on the vacuum wheel by the vacuum. The decals are then transferred around the wheel to a spring loaded pressure roller 52 and are applied thereby to new backing paper 54, which is fed from a powered uncoiler roller 56 of the type used for roller 12. The vacuum is drawn only in a section of the interior portion 36 of the vacuum wheel, commencing before the decals are formed (preferably where the backing material is stripped from the decal material) and terminating at pressure roller 52. Cutting off the vacuum at pressure roller 52 facilitates removal of the decals from the vacuum wheel on the backing material 54.

If the original decal material does not have a preapplied adhesive, an adhesive is applied to the formed decals by a rotating adhesive applying wheel 51 (shown in phantom in FIG. 2) before the decals are applied to new backing paper.

As perhaps a preferable alternative to new backing material, the decal material can be reapplied to the old backing material transferred from roller 26 by routing backing material 16" around roller 56, over rollers 55 and 57, and then to roller 57, in the manner shown in phantom in FIG. 2.

At the next station, premask material 58 is applied to the decals. The premask is fed from a roller 60 (an idler type uncoiler with a friction brake) and is applied to the decals by a roller 62 positioned adjacent the upper surface of the backing material.

The sandwich of premask material, decals, and backing material then passes through printing rollers 64 wherein any printing on the premask (e.g., registration lines) is accomplished. The decal material then advances through a pair of opposed cutting rollers 66 which rotate in opposite directions in order to cut the web into separate decal units. The separated decals are then packaged for shipment.

The various elements in the apparatus are operated by separate D.C. electrical motors, with a vacuum wheel master control 68 (shown schematically in FIG. 2) regulating all of the electrical motors. Conventional web tensioning and registration apparatus manufactured by Borg Warner is used to obtain proper registration of the letters on the vacuum wheel.

To use the decals thus formed the premask material is first stripped away from the backing material. The premask material is more adhesive than the backing material so that when the premask material is removed from the backing material, the decal adheres to the premask and is peeled away from the backing. The decal is then applied to glass or the like. The adhesive characteristics of the premask material are such that the adhesion between the decal and the surface to which the decal is being applied is greater than the adhesion between the premask material and the decal. Thus, after the decal is pressed against the surface to which it is being applied, the premask material can then be peeled away from the decal.

Figure 3:
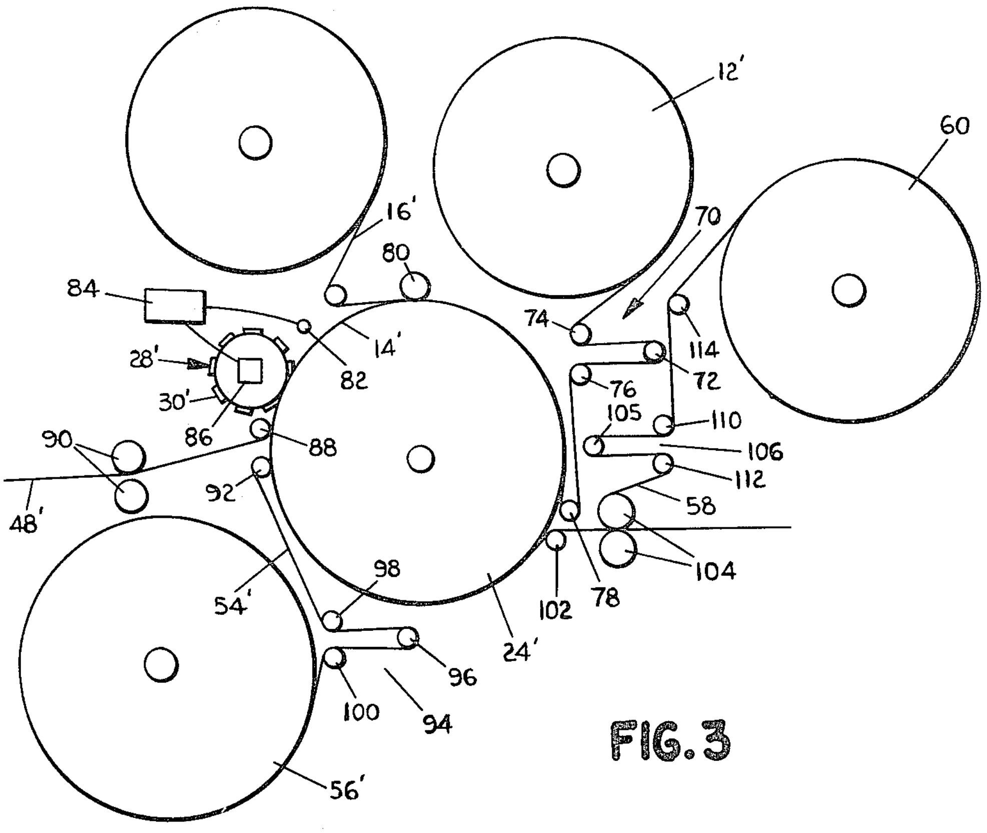
FIG. 3 is a schematic side elevational view of an alternative embodiment of the type of decal making apparatus shown in FIG. 1.

An alternative construction of the vacuum wheel apparatus shown in FIGS. 1 and 2, is shown schematically in FIG. 3. In this apparatus, a roll 12' of vinyl decal material 14' affixed to a backing material 16' constituting release paper is fed over a web tensioning mechanism or idler system 70 comprising dancing bars or idler arms 72,74 and 76, wherein idler arm 72 is biased away from idler arms 74 and 76 so as to maintain tension on the web. The web then proceeds under roller 78 and is pressed against the surface of vacuum wheel 24'. A separate roller 80 at the top of the vacuum wheel maintains the web in contact with the surface of the wheel. After the web passes under roller 80, backing material 16' is stripped from the vinyl decal material 14'. A photoelectric sensor 82 between roller 80 and rotary heated die 18' senses the position of the perforated figures on vacuum wheel 24' and controls the registry of the heated die such that the die elements 30' register with the outlines of the decal elements on the vacuum wheel as the rotary die is rotated. Registry of the rotary die by means of photocell 82 is accomplished by a conventional registration device 84 as discussed above. Registration device 84 is shown schematically in FIG. 3 as interconnecting photocell 82 and drive mechanism 86 for the rotary die.

After the decal configurations have been cut from the vinyl decal material, the weed or exterior waste portion 48' passes under a roller 88 and is removed from the vacuum wheel. The weed then passes through a pair of opposed rollers 90 and is taken up on a powdered recoiler or roller (not shown) of the type shown as element 50 in FIG. 1.

The center portions of the decals are removed in the manner shown in FIG. 4 as the decals move on the vacuum wheel from the rotary die element to roller 92, wherein new or previously stripped backing or release paper 54' is fed from roll 56' over tensioning mechanism 94 before it passes over roller 92 and contacts the decals. As described above, the tensioning mechanism comprises a roller 96 biased away from rollers 98 and 100, with the backing material passing over the rollers so as to maintain continuous tension in the backing material.

The backing material and the decals are held together for a substantial portion of the periphery of the vacuum wheel until the backing material and attached decals are removed from the wheel over a roller 102. The material then passes between rollers 104, wherein premask material 58 is applied, and the web then continues on for the same operations shown in FIG. 1. An idler mechanism 106 consisting of roller 108 biased away from rollers 110 and 112 serves to maintain tension in the premask material. To provide the proper orientation of the premask material, the material passes over roller 114 after it leaves premask roll 60. Premask roll 60 is an idler type uncoiler having a friction brake. The same type of roll is used in the embodiment shown in FIG. 1.

Figure 5:
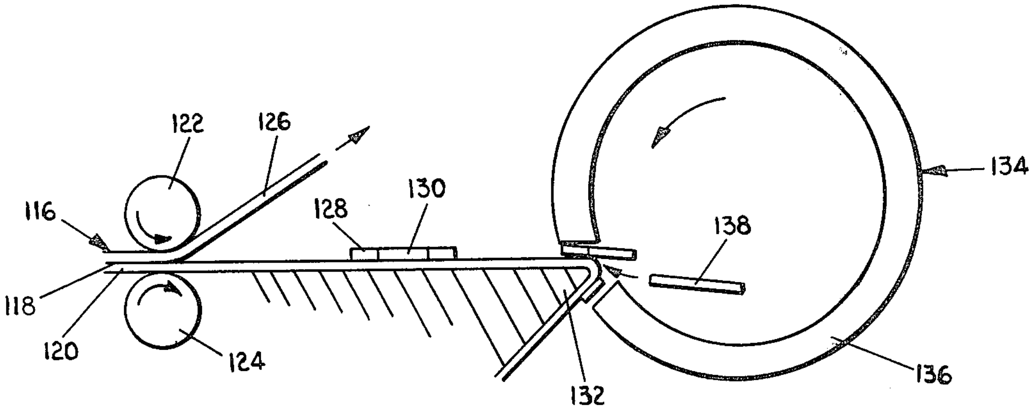
FIG. 5 is a schematic side elevational view of a second embodiment of the decal manufacturing apparatus of the present invention, using a peeling bar and employing an air jet to enhance removal of the core of the decal.

Another embodiment of the present invention is shown in FIG. 5, with alternatives of this embodiment shown in FIGS. 6, 7, 8 and 9.

In FIG. 5, a web 116 consisting of vinyl decal material 118 fixed to a release or backing paper 120 proceeds along a path to a rotary die 122 positioned above roller 124. Rotary die 122 and roller 124 rotate in opposite directions, with roller 124 forming a cutting surface underneath the die. Die 122 is positioned a specific fixed distance away from roller 124 so that as the die rotates it cuts the configuration of the decals into the decal material without cutting through the backing material. A heated die of the type used in the embodiments described above is also used in this embodiment.

After the configuration of the decals have been cut into the vinyl decal material the weed portion 126 is peeled away from the backing material, leaving only the decal 128 and core portion 130 on the backing material. The backing material is then passed over a sharp edge or peeling bar 132, which preferably is formed at an acute angle. Passing the backing material over the peeling bar tends to cause the decals to peel away from the backing material.

However, a rotating cushioned wheel 134 is positioned adjacent to the edge of peeling bar 132 and rotates in the direction of and in registry with the movement of the backing material over the peeling bar. A cushioned outer surface 136 on the wheel resiliently engages the outer surface of the decal 128 as it passes over the peeling bar, thus urging the decal to remain on the backing paper as it passes over the peeling bar. The resilient outer portion (which may be a foamed resilient material) includes openings which register with the core portions of the decal material. The openings are positioned such that the resilient outer surface of the rotating wheel does not engage the core portions that are to be removed from the interior portion of the decals. Thus, these core portions are peeled from the backing material by the peeling bar and protrude into the inner portion of the rotating wheel, which is hollow.

In FIG. 5, an air jet emanating from nozzle 138 and directed at the underside of the core portion (i.e., directed between the core portion and the backing material) urges the core portion to peel away from the backing material. When it is removed from the backing material, the core portion falls within the interior of the hollow rotating wheel it is thereafter withdrawn by a vacuum or other such means.

Figure 6:
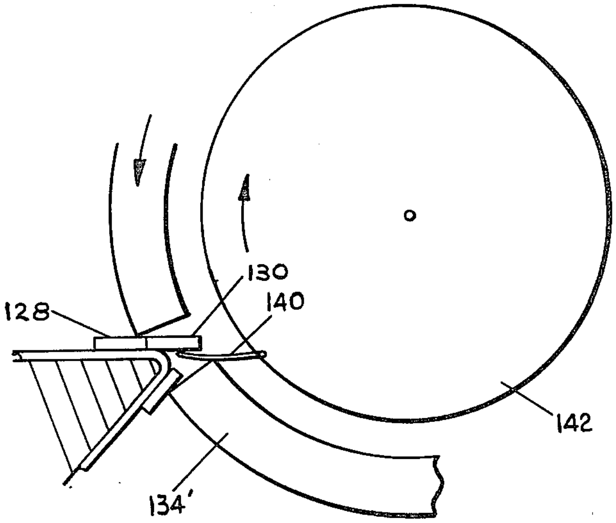
FIG. 6 is an alternative embodiment of the apparatus of FIG. 5, showing the use of the mechanical core picking device to remove the core from the decal.

An alternative means for removing the core portions of the decals is shown in FIG. 6. In this embodiment, cushioned wheel 134′ rotates in a manner of cushioned wheel 134 in FIG. 5. However, instead of an internal air jet being used to dislodge the core portions from the decal and backing material, a mechanical finger 140 rotates on a wheel 142 counter to the direction of wheel 134′ in the interior of wheel 134′. Thus, while wheel 134′ rotates in the same direction as the decals over the edge of the peeling bar, internal wheel 142 rotates in the opposite direction (i.e., clockwise direction as shown in FIG. 6). As the core portions protrude in the interior of the cushioned wheel, core picking finger 140 engages the undersides of the core portion and picks them out of the center of the decals. Only a single core picking finger is shown in FIG. 6 for illustrative purposes. However, it should be recognized that a number of core picking fingers positioned to register with the core portions of the decals would ordinarily be affixed to the outer surface of wheel 142.

Figure 7:
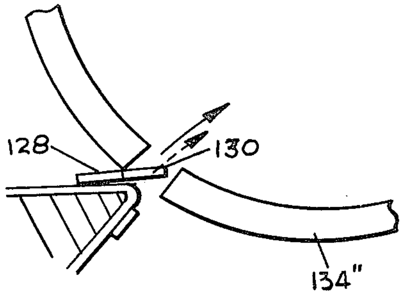
FIG. 7 is another alternative embodiment of the apparatus shown in FIG. 5, showing a vacuum apparatus for removing the core from the decal.

Still another means for removing the core portions from the backing material in this type of apparatus is shown in FIG. 7, wherein a vacuum is drawn on the interior portion of rotating wheel 134″, and the vacuum draws the core portion into the interior hollow portion of the wheel.

Figure 8:
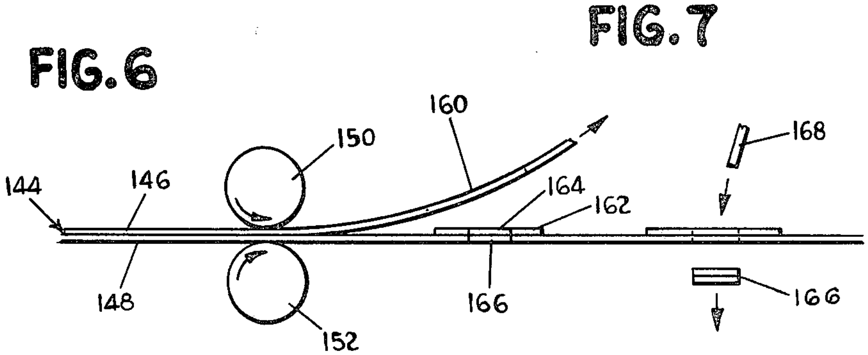
FIG. 8 is a side elevational schematic view showing still another embodiment of the present invention.
Figure 9:
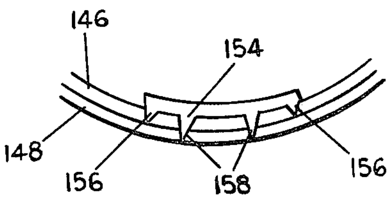
FIG. 9 is a side elevational view showing the configuration of the decal cutting die employed in the embodiment of FIG. 8.

Still another means for manufacturing decals wherein core portions are automatically removed from the decals is shown in FIGS. 8 and 9. In this apparatus and method, a web 144 consisting of vinyl decal material 146 affixed to a release paper backing 148 is conveyed through rollers 150 and 152. Roller 150 is a rotating die of the type described above, wherein a plurality of die elements cut the configurations of the decals into the decal material. Rotating roller 152 serves as a cutting surface for operation of rotating die 150. Each die element 154 fixed to rotating die 150 has a somewhat different configuration than the die elements discussed above. Whereas the die elements on rotating die 122 cut only through the vinyl material, each die element 154 has an exterior cutting edge 156 that cuts only through the vinyl material but has an interior cutting edge 158 that cuts through both the vinyl decal material and through the backing material for the interior portion of the decal. The die is otherwise a conventional heated die of the type described above.

After the decal configuration has been cut into the material, the weed 160 is stripped from the backing material leaving decals 162 affixed to the backing material. A core portion 164 of the decal material and a corresponding core portion of 166 of the backing material have been completely cut out of backing and decal material and are dislodged downwardly into an open space below the web by means of an air jet through nozzle 168.

If desired, new backing material can be applied in place of the old backing material after the openings have been formed therethrough.

In all of the embodiments shown in FIGS. 5 through 9, a premasking material can be affixed subsequent to removal of the core portions in the manner shown in FIGS. 1 and 3. The other remaining steps, such as printing and cutting also can be performed.

It should be understood that the foregoing embodiments are merely exemplary of the preferred practice of the present invention and that various changes and modifications may be made in the arrangements and details of construction of the embodiments disclosed herein without departing from the spirit and scope of the present invention.

The embodiments of the invention in which an exclusive property or privilege is claimed are defined as follows:

1. A method for manufacturing decals from a web of synthetic decal stock, wherein the decals have an open interior portion that requires removal of a separate core portion of waste material from the decal stock during manufacture, the method comprising:

cutting the decals in the decal stock at spaced intervals in the web;

affixing the decals to a vacuum surface wherein the decals are urged to adhere to a perforated surface by a vacuum drawn through the perforations, the perforations in the surface being small enough to prevent the decal itself from being drawn through the perforation but the vacuum surface having enlarged openings conforming in position to any waste core portions of the decal, the enlarged openings and the vacuum being sufficient to draw the waste core material through the openings in the surface and away from the decals, leaving the decals with their desired open interior portions;

stripping away from the decals the waste portions of the decal stock on the exterior of the decals, such that the decals are retained by the vacuum on the vacuum surface; and removing the decals from the vacuum surface.

2. A method according to claim 1 wherein the decal stock is affixed to a backing material and the method further comprises the step of stripping the backing material from the decal stock before the decals are cut into the decal stock.

3. A method according to claim 2 wherein the formed decals are removed from the vacuum surface by affixing the decals to backing material brought in contact with the decals on the vacuum surface and thereafter conveying the backing material and attached decals away from the vacuum surface.

4. A method according to claim 3 wherein the decals are affixed to the same backing material from which the original decal stock was stripped.

5. A method according to claim 3 wherein the decals are affixed to new backing material.

6. A method according to claim 1 wherein the vacuum surface is provided on a rotating vacuum wheel, with the material passing over the outer surface of the wheel and the decals being retained on the wheel by a vacuum drawn through perforations in said outer surface, the waste core portions of the decals being drawn into the interior portion of the wheel through enlarged openings in the wheel at positions opposite the core portions.

7. A method according to claim 6 wherein the decals are cut from the web by a rotating die as the web passes over the vacuum wheel, the waste exterior portion of the web being stripped away from the decals and the waste core portions being drawn into the wheel after the decals have been cut, the decals thereafter being transferred under vacuum to a position on the wheel where the decals are applied to backing paper, the backing paper and attached decals thereafter being conveyed away from the vacuum wheel.

8. A method according to claim 7 wherein the perforations in the vacuum wheel correspond with the shapes of the decals and are positioned so as to register with the decals as the decals are cut into the web, the enlarged openings conforming generally with the shape of the core portions of the decals and registering therewith.

9. A method according to claim 7 wherein the decal stock is originally affixed to backing material and the method further comprises the step of stripping the backing material from the decal stock before the decals are cut into the decal stock, the stripping occurring while the decal stock engages the outer surface of the vacuum wheel, the vacuum in the vacuum wheel being cut off at the point where the formed decals are affixed to backing material such that removal of the decals from the vacuum wheel is facilitated, the decals being applied to the backing material at such point by means of a pressure roller that presses the backing paper against the decals on the outer surface of the vacuum wheel.

10. A method for manufacturing decals from a continuous web of decal stock, wherein the decals have an open interior portion that requires removal of a separate core portion of waste material from the decal stock during manufacture, comprising:

bringing the web of decal material into contact with a cylindrical outer surface of a rotating vacuum wheel such that the web travels with the vacuum wheel for at least a portion of its revolution, the cylindrical outer surface having openings therein and a vacuum being drawn in the vacuum wheel so as to create an inward air flow and pressure drop through the openings, the web being held on the surface of the vacuum wheel by said pressure drop and the openings in the surface being small enough to prevent the decal itself from being drawn through the openings but the vacuum surface having enlarged openings conforming in position to the waste core portions of the decal, the enlarged openings and the vacuum being sufficient to draw the waste core material through the openings in the surface and away from the decals, leaving the decals with their desired open interior portions;

cutting a continuous series of spaced decal configurations in the decal stock with a rotating cutting die that is positioned for contact with the decal stock as the decal stock passes over the vacuum wheel;

stripping the waste portions of the decal stock away from the vacuum wheel after the decals have been formed, leaving the decals affixed to the vacuum wheel by the vacuum therein;

applying the decals to a web of backing material brought into contact with the cut decals on the outer surface of the vacuum wheel, such that the decals adhere to the backing material; and stripping the backing material and affixed decals away from the vacuum wheel, whereby decals are produced continuously from a web of decal material.

11. A method for manufacturing decals from a continuous web of decal material attached to a backing material, wherein the decals include open interior portions that are formed by removing separate core portions from the decals, the method comprising:

passing the web over a cutting surface with the backing material being under the decal material;

cutting the configuration of the decal into the decal material;

stripping away from the decals the waste portion of the web of decal material on the exterior of the decal;

passing the backing material and attached decals over a peeling bar such that the decals are urged to peel off the backing material;

resiliently pressing the decals against the backing material as the decals pass over the peeling bar so as to prevent the decals from peeling off, the core portions not being so pressed against the backing material such that the core portions are peeled from the backing material as they pass over the peeling bar; and removing the core portions from the decals as the core portions are peeled from the backing.

12. A method according to claim 11 wherein the decals are formed at spaced intervals in the web by a rotary die, the die being positioned such that it cuts only through the decal material and not the backing material as the decals are formed, the decals being pressed against the backing material as they pass over the peeling bar by means of a rotating wheel having a resilient outer surface in contact with the decal side of the web as it passes over the peeling bar, the wheel having openings in the outer periphery that register with the core portions of the decals, such that the core portions tend to peel off the backing material and protrude into said openings, the core portions being urged into the interior of the wheel and away from the decals by pneumatic or mechanical core portion removal means associated with the wheel.

13. A method according to claim 12 wherein the core portions are removed pneumatically by an air jet directed under the core portions so as to urge them to peel away from the backing material and decals.

14. A method according to claim 12 wherein the core portions are removed by a vacuum in the wheel that draws the core portions into the interior of the wheel.

15. A method according to claim 12 wherein the core portions are removed by mechanical core picking means rotatably mounted in the wheel for counter rotation with respect thereto, the core picking means mechanically engaging and removing the core portions as they protrude into the opening in the wheel.

16. A method for manufacturing decals from a continuous web of decal material attached to a backing material, wherein the decals include open interior portions that are formed by removing a separate core portion from the decal, the method comprising:

passing the web over a cutting surface with the backing material being under the decal material;

cutting the configuration of the decal into the decal material, the decal configuration being cut only through decal material for the exterior portions of the decals but being cut through both the decal material and backing material for the interior portions of the decals;

stripping away from the decals the waste portion of the web of decal material on the exterior of the decal; and dislodging the core portions of decal material and backing material from the web.

17. A method according to claim 16 wherein the core portions are pneumatically urged away from the web.

* * * * *